(12) United States Patent
Wang

(10) Patent No.: US 6,456,977 B1
(45) Date of Patent: Sep. 24, 2002

(54) VOICE CONTROL MODULE FOR CONTROLLING A GAME CONTROLLER

(75) Inventor: Jong-Ding Wang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/231,711

(22) Filed: Jan. 13, 1999

(30) Foreign Application Priority Data

Oct. 15, 1998 (TW) ........................................ 87117150 A

(51) Int. Cl.[7] ................................................ G10L 21/00
(52) U.S. Cl. ..................... 704/275; 704/272; 704/270; 704/231; 345/168
(58) Field of Search .................... 704/270–275, 704/231, 251, 243; 345/473, 327, 302, 353, 978, 168; 348/232; 434/169, 307; 463/35, 36, 1, 16; 600/545

(56) References Cited

U.S. PATENT DOCUMENTS

| | | | | |
|---|---|---|---|---|
| 4,704,696 A | * | 11/1987 | Reimer et al. ............... | 704/275 |
| 5,386,494 A | * | 1/1995 | White ......................... | 704/275 |
| 5,513,129 A | * | 4/1996 | Bolas et al. ................. | 364/578 |
| 5,739,811 A | * | 4/1998 | Rosenberg et al. .......... | 345/161 |
| 5,774,841 A | * | 6/1998 | Salazar et al. .............. | 704/225 |
| 5,809,466 A | * | 9/1998 | Hewitt et al. ............... | 704/258 |
| 5,893,064 A | * | 4/1999 | Kudirka et al. ............. | 704/275 |
| 5,993,314 A | * | 11/1999 | Dannenberg et al. ......... | 463/1 |
| 5,995,155 A | * | 11/1999 | Schindler et al. ........... | 348/461 |
| 6,015,344 A | * | 1/2000 | Kelly et al. .................. | 463/16 |

* cited by examiner

*Primary Examiner*—Vijay B Chawan
(74) *Attorney, Agent, or Firm*—Winston Hsu

(57) ABSTRACT

The present invention provides a voice control module for controlling a game controller comprising: a microphone for inputting voice signals, a first voice recognition device of command mode for converting the voice signals inputted from the microphone within a time period into a corresponding game command, and a second voice recognition device of continuous mode for converting the voice signals continuously inputted from the microphone into a corresponding switch command. Wherein after the switch command is converted, the second voice recognition device initiates the first voice recognition device to convert the voice signals inputted from the microphone within the time period into a corresponding game command to control the game controller.

11 Claims, 5 Drawing Sheets

VOICE CONTROL MODULE FOR CONTROLLING A GAME CONTROLLER

BACKGROUND OF THE INVENTION

1. Field of the invention

The present invention relates to a voice control module, and more particularly, to a voice control module for controlling a game controller.

2. Description of the Prior Art

The user interface of a computer game such as a computer joystick commonly comprises a movable control handle and a plurality of control buttons. The advantage of the control handle and control buttons is ease of operation. However, the various setup and functions of the control buttons vary from game to game. This is obviously not user-friendly as it requires the user to remember different functions for each control button depending on which program is being used. Also, while engrossed in game play, a user may inadvertently press the wrong button as he is unable to watch the keypad and the screen at the same time. This disrupts game play and causes user frustration.

With the advent of voice recognition technology, it can be applied to solve the above mentioned problem. There are currently several voice recognition modules on the market including continuous mode voice recognition and command mode voice recognition devices. As the names imply, the continuous mode voice recognition device recognizes voice input continuously and the command mode voice recognition device does so only intermittently.

In continuous mode, any time voice signals are inputted through the microphone, recognition signal processing occurs immediately. In this process, the input voice signals are compared with pre-existent commands stored in the memory. If an input voice signal is identical to one of the stored commands, the corresponding command will be executed. If there are too many pre-existent commands, it will take too long to compare each one individually. If the time interval between two input voice signals is not long enough, the commands will not be executed at once.

In command mode, a specific button should be pressed first before each voice command is inputted. This alerts the controller to expect an input voice signal. If the input voice command is identical to one of the pre-existent commands, it will be executed. Here, recognition occurs only when a button is pressed so the storage capacity of commands is high. However, it is not convenient for users.

SUMMARY OF THE INVENTION

It is therefore a primary objective of the present invention to provide a voice control module for controlling a game controller, which combines continuous mode and command mode in voice recognition to solve the above mentioned problem.

In a preferred embodiment, the present invention provides a voice control module for controlling a game controller comprising:

a microphone for inputting voice signals;

a first voice recognition device for converting the voice signals inputted from the microphone within a time period into a corresponding game command; and a second voice recognition device for converting the voice signals continuously inputted from the microphone into a corresponding switch command;

wherein after the switch command is converted, the second voice recognition device initiates the first voice recognition device to convert the voice signals inputted from the microphone within the time period into a corresponding game command to control the game controller.

It is an advantage of the present invention that the voice control module will distinguish each voice signal automatically without the need for pressing any button, hence it is very easy to use and game play is more fluent.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
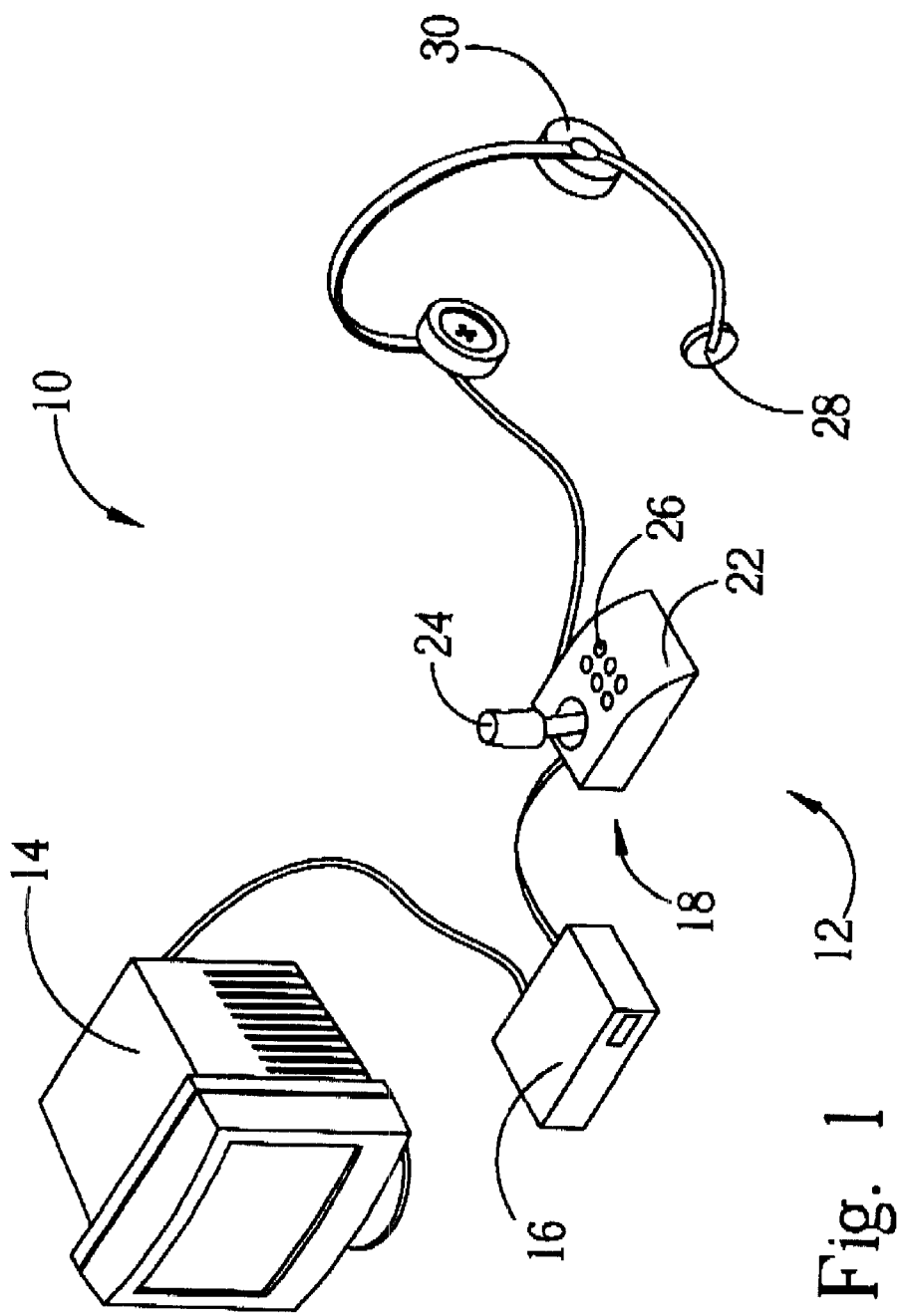
FIG. 1 is a schematic diagram of the voice control module used in a computer game system in the present invention.
Figure 2:
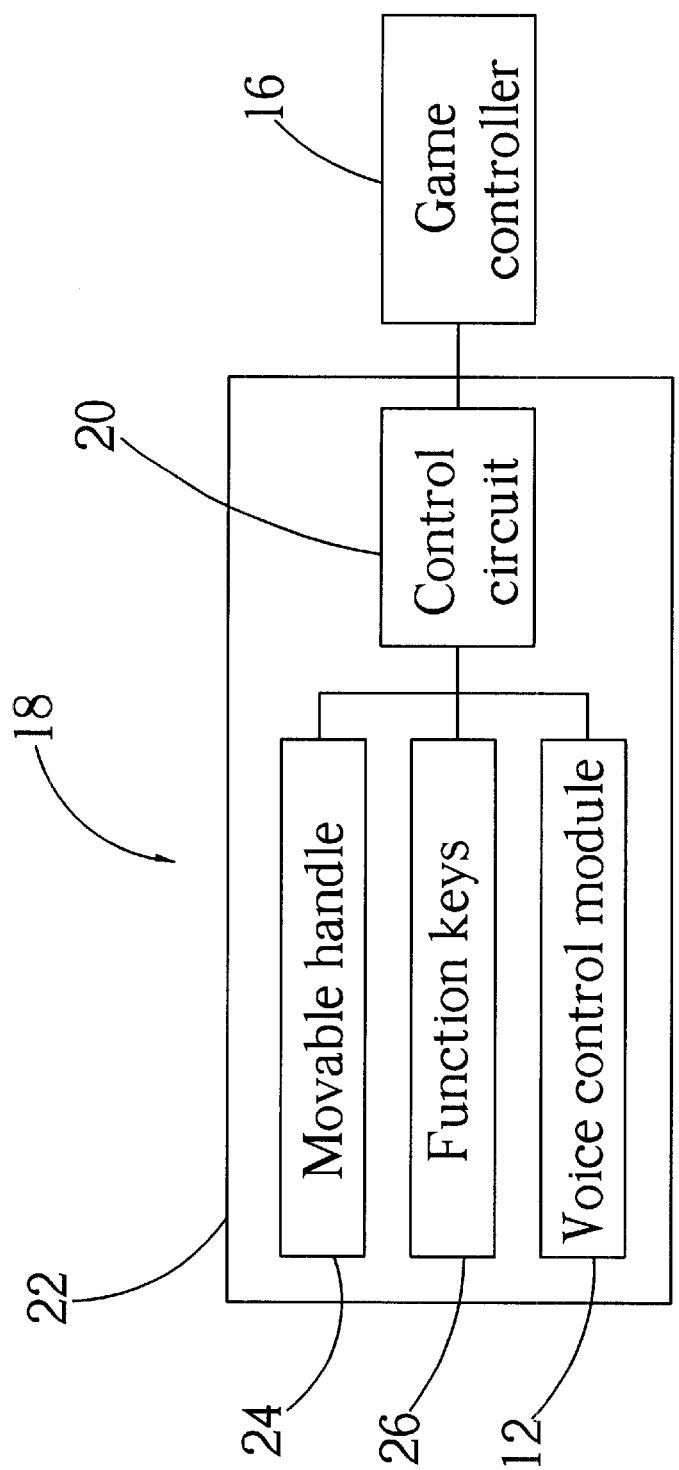
FIG. 2 is a functional block diagram of the computer joystick shown in FIG. 1.

Please refer to FIG. 1 and FIG. 2. FIG. 1 is a schematic diagram a voice control module 12 used in a computer game system 10 in the present invention. FIG. 2 is a functional block diagram of the computer joystick 18 shown in FIG. 1. The computer game system 10 comprises a game controller 16, a voice control module 12 for controlling the input voice signals for controlling the game controller 16, a display device 14 used for displaying a screen of images, and a computer joystick 18 used for producing cursor signals as well as input signals from the keyboard for controlling the game controller 16. The game controller 16 may be a PC or a PC game box. The voice control module 12 comprises a microphone 28 used for inputting voice signals and a speaker used for indicating the result of each conversion made by voice recognition devices to the user.

The computer joystick 18 comprises a housing 22, a control circuit 20 installed inside the housing 22 for controlling the game controller 16, a movable handle 24 installed on the housing 22 and connected to the control circuit 20 for producing displacement signals for controlling the displacement of the object of the game, a plurality of function keys 26 installed upon the housing 22 and connected to the control circuit 20 for producing a plurality of key-pressed signals, and a voice control module 12 electrically connected to the control circuit 20 for processing the input voice signals.

Figure 3:
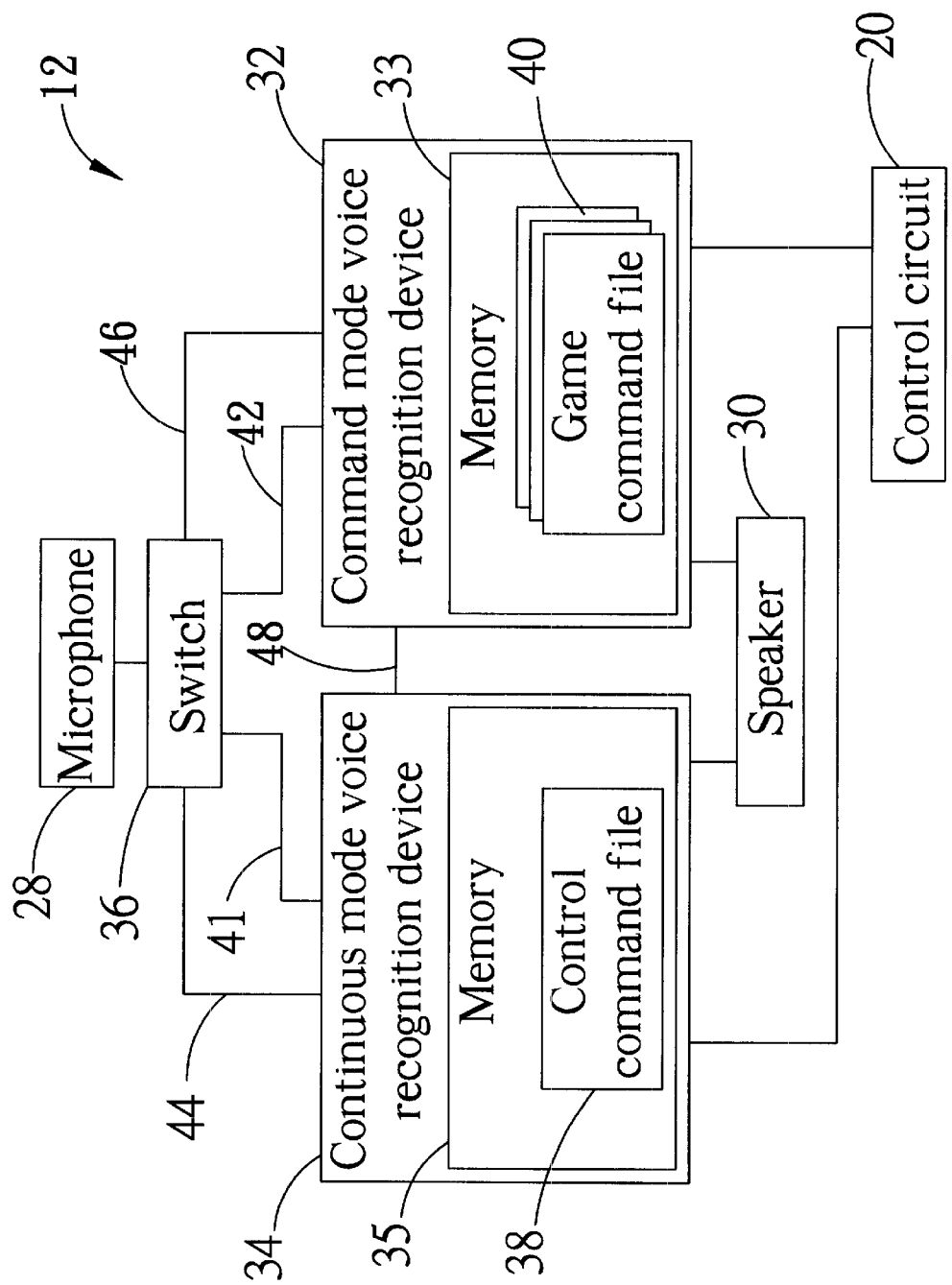
FIG. 3 is a functional block diagram of the voice control module shown in FIG. 2.

Please refer to FIG. 3. FIG. 3 is a functional block diagram of the voice control module 12 shown in FIG. 2. The voice control module 12 comprises a command mode voice recognition device 32 for performing recognition in command mode, a continuous mode voice recognition device 34 for performing recognition in continuous mode, i.e. continuously, and a switch 36 used for sending the voice signals inputted from the microphone 28 to the continuous mode voice recognition device 34 or command mode voice recognition device 32. The continuous mode voice recognition device 34 comprises a memory 35 for storing a control command file 38 which will be executed if the input voice signal is identical to the predetermined command stored in the control command file 38. The predetermined commands stored in the control command file 38 can be divided into two categories, either execution commands for direct execution or switch commands for switching recognition modes. The command mode voice recognition device 32 also comprises a memory 33 for storing a plurality of game command files 40 each corresponding to a switch command of the control command file 38. The continuous mode voice recognition device 34 converts the voice signals inputted through the microphone 28 into a corresponding switch command according to the control command file 38, then triggers the command mode voice recognition device 32 to convert the voice signals into a corresponding game command according to the game command file 40 corresponding to the converted switch command of the control command file 38 so as to control the game controller 16.

As depicted in FIG. 3, the control line used by the continuous mode voice recognition device 34 to control the switch, 36 is indicated by the connecting line 44 in the voice control module 12, the control line used by the command mode voice recognition device 32 to control the switch 36 is indicated by the connecting line 46, the voice carrying line between the continuous mode voice recognition device 34 and the switch 36 is indicated by the connecting line 41, the voice carrying line between the command mode voice recognition device 32 and the switch 36 is indicated by the connecting line 42, and the control line used by the continuous mode voice recognition device 34 to control the command mode voice recognition device 32 is indicated by the connecting line 48.

During recognition of the voice control module 12, the switch 36 is first directed to deliver the voice signals inputted from the microphone 28 to the continuous mode voice recognition device 34. If this voice signal is identical to one of the execute commands in the control command file 38, then the continuous mode voice recognition device 34 will transmit this execute command to the game controller 16 to be executed directly via the control circuit 20. If the voice signal received by the continuous mode voice recognition device 34 is identical to one of the switch commands in the control command file 38, then the continuous mode voice recognition device 34 will initiate the command mode voice recognition device 32 and at the same time control the switch 36 via control line 44 to deliver the voice signals inputted from the microphone 28 to the command mode voice recognition device 32 for 3 seconds.

When the command mode voice recognition device 32 is initiated, it will choose a corresponding game command file 40 according to the switch command converted by the continuous mode voice recognition device 34, and then convert the voice signals into a corresponding game command according to the chosen game command file 40. After 3 seconds, the command mode voice recognition device 32 will direct the switch 36 to deliver the voice signals back to the continuous mode voice recognition device 34 via the control line 46. When the voice signal of the user is successfully converted into a command, the voice control module 12 sends a signal such as two high beeps to the user through the speaker 30 that input was successful. When the voice signals cannot be converted into any command, the control module 12 emits a signal such as a low beep through the speaker 30 to the user that the input was unsuccessful.

Figure 4:
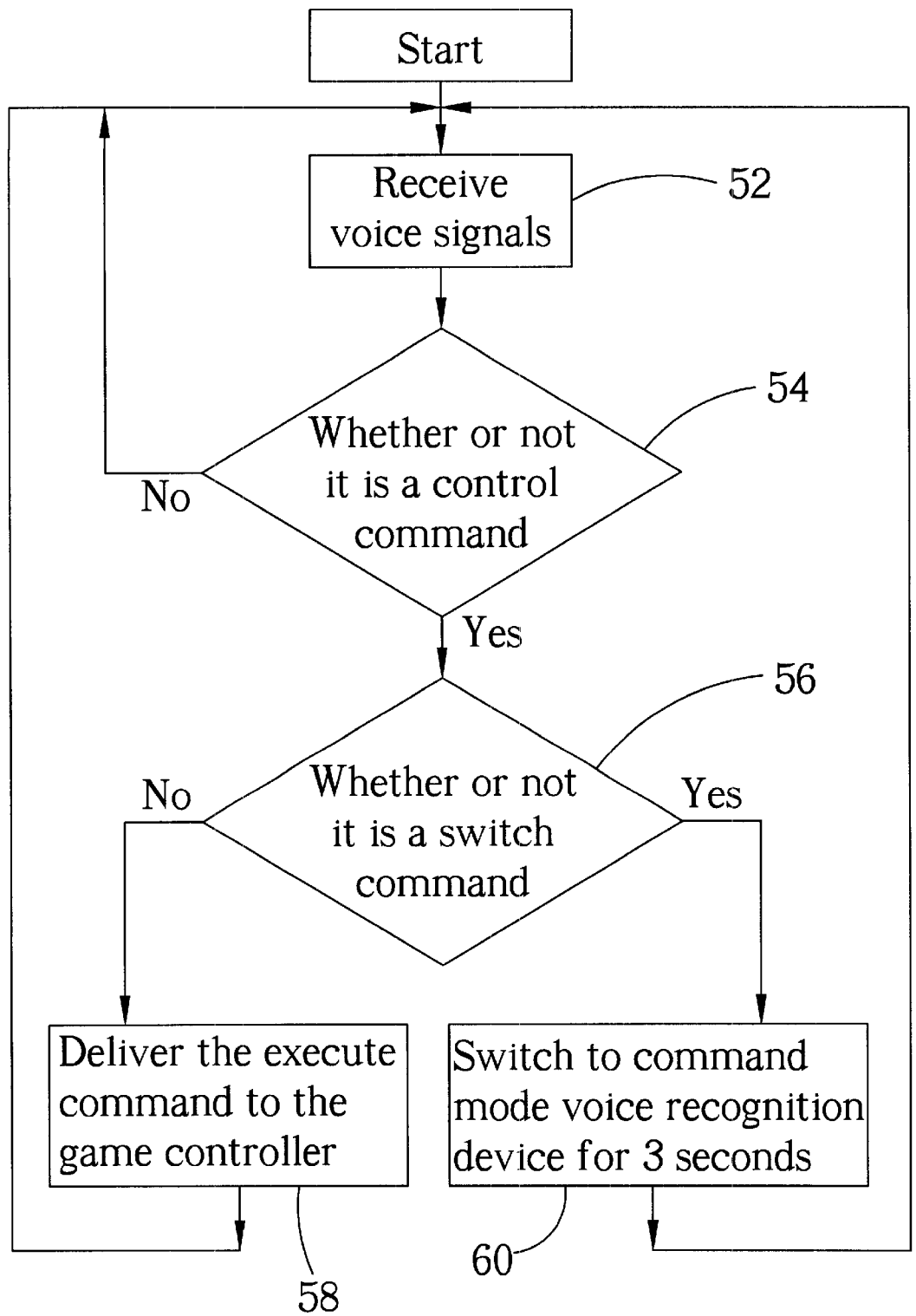
FIG. 4 is a flow chart of the continuous mode voice recognition device.

Please refer to FIG. 4. FIG. 4 is a flow chart of the continuous mode voice recognition device 34. It comprises the following steps:

Step 52: Receive voice signals delivered from switch 36;
Step 54: Recognize whether the voice signal is a control command or not according to the control command file 38; if not, go back to step 52 and wait for a new input;
Step 56: Covert the inputted voice signal into a corresponding control command and determine whether or not it is a switch command; if it is, go to step 60;
Step 58: Deliver the command to the game controller 16 via control circuit 20 to enable the game controller 16 to execute this command, also inform the user that input is correct by using speaker 30, then go back to step 52 and wait for a new input;
Step 60: Initiate the command mode voice recognition device 32 by use of the control line 46, and control the switch 36 to deliver the voice signals inputted from the microphone 28 within 3 seconds to the command mode voice recognition device 32; after 3 seconds, go back to step 52 and wait for a new input.

Figure 5:
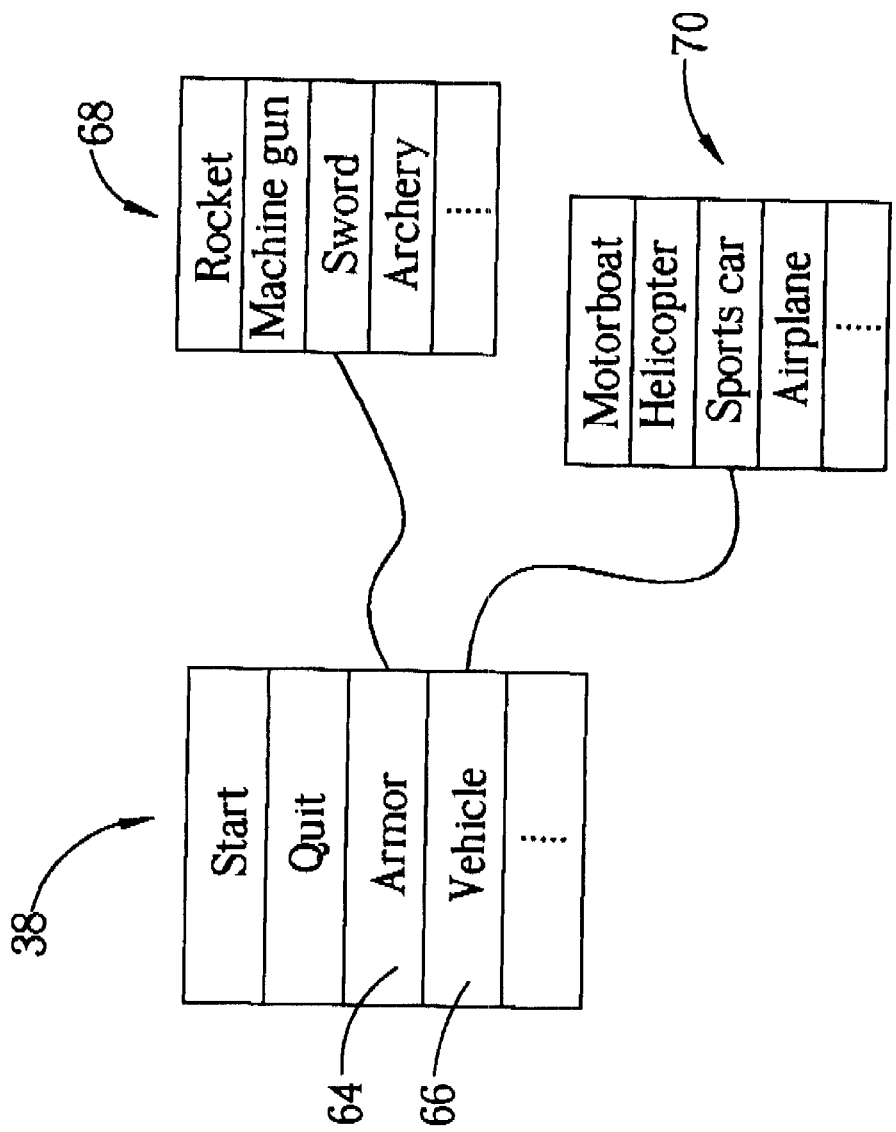
FIG. 5 is a preferred embodiment of the various command files showed in FIG. 3.

Please refer to FIG. 5. FIG. 5 is a preferred embodiment of the various command files shown in FIG. 3. The control command file 38 comprises two execute commands and two switch commands. "Start" and "quit" are execute commands and "change weapon" and "change vehicle" are switch commands 64, 66. Each switch command corresponds to a game command file. For example, switch command 64 "change weapon" corresponds to the game command file 68 which contains game commands such as "rocket" and "machine gun", and the switch command 66 "change vehicle" corresponds to a game command file 70 which contains game commands such as "motorboat" and "helicopter". Once voice signal "change weapon" is input, it will be successfully converted into a switch command 64 via the continuous mode voice recognition device 34. If voice signal "rocket" is input within 3 seconds, the command mode voice recognition device 32 will covert it into a game command according to the game command file 68. This game command will then be sent to the game controller 16 to be directly executed. However, if "motorboat" is input after "change weapon", the command mode voice recognition device 32 will cause a low beep signal to be emitted from the speaker 30 because "motorboat" is not in the game command file 68. This signal informs the user to re-input the voice command.

In the present invention, the voice control module 12 controls the game controller via the voice commands inputted from the microphone 28. The continuous mode voice recognition device 34 recognizes whether or not the voice is a switch command. If it is, then after the switch command is converted, the continuous mode voice recognition device 34 will initiate the command mode voice recognition device 32 to convert the voice signals inputted from the microphone within a specified time period into a corresponding game command to control the game controller. Hence, no buttons need to be pressed and the voice control module 12 automatically distinguishes signals. This makes usage of the voice control module 12 easy and game play more fluent.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A voice control module for controlling a game controller comprising:
   a microphone for inputting voice signals;
   a first voice recognition device having a memory for storing a plurality of game command files and being used for converting first voice signals inputted from the microphone within a time period into a corresponding game command, each of the game command files comprising corresponding first voice signals of a plurality of game commands; and a second voice recognition device having another memory for storing a control command file and being used for converting second voice signals continuously inputted from the microphone into a corresponding switch command, the control command file comprising corresponding second voice signals of a plurality of switch commands, each of the game command files stored in the memory of the first voice recognition device being corresponding to a switch command of the control command file;

wherein after the second voice recognition device converts the second voice signals inputted from the microphone into a corresponding switch command that corresponds to one of the game command files stored in the memory of the first voice recognition device, the second voice recognition device initiates the first voice recognition device to convert the first voice signals inputted from the microphone within the time period into a corresponding game command in the game command file corresponding to the switch command to control the game controller.

2. The voice control module of claim 1 further comprising a switch for delivering the voice signals inputted from the microphone to the first or second voice recognition device wherein after the switch command is converted, the second voice recognition device controls the switch to deliver the voice signals inputted from the microphone to the first voice recognition device so as to enable the first voice recognition device to convert the voice signals into the corresponding game command.

3. The voice control module of claim 1 further comprising an output device for acknowledging the result of each conversion made by the first or second voice recognition device.

4. The voice control module of claim 3 wherein the output device is a speaker.

5. The voice control module of claim 1 wherein the first and second voice recognition devices are installed in a computer joystick which is used for generating pointing and key command signals to control the game controller.

6. A method for controlling a game controller controlled by a voice control module, the voice control module comprising:

a microphone for inputting voice signals;

a first voice recognition device for converting first voice signals into a game command; and a second voice recognition device for converting second voice signals into a switch command;

the method comprising:
using the second voice recognition device to convert second voice signals continuously inputted from a microphone into a switch command; and
using the first voice recognition device to convert first voice signals inputted from the microphone into a game command to control the game controller within a time period after the switch command is converted;
wherein after the switch command is converted, the second voice recognition device initiates the first voice recognition device to convert the voice signals inputted from the microphone within the time period into the game command to control the game controller.

7. The method of claim 6 wherein the voice control module further comprises a switch for delivering the voice signals inputted from the microphone to the first or second voice recognition device, after the switch command is converted, the second voice recognition device controls the switch to deliver the voice signals inputted from the microphone to the first voice recognition device so as to enable the first voice recognition device to convert the voice signals into the game command.

8. The method of claim 6 wherein the second voice recognition device comprises a memory for storing a control command file which comprises second voice signals of a plurality of switch commands, and the first voice recognition device also comprises a memory for storing a plurality of game command files each being corresponding to a switch command of the control command file and comprising first voice signals of a plurality of game commands, and wherein after converting the voice signals inputted from the microphone into a corresponding switch command according to the control command file, the second voice recognition device initiates the first voice recognition device to convert the voice signals inputted from the microphone into a corresponding game command according to the game command file corresponding to the converted switch command.

9. The method of claim 6 wherein the voice control module further comprises an output device for acknowledging the result of each conversion made by the first or second voice recognition device.

10. The method of claim 9 wherein the output device is a speaker.

11. The method of claim 6 wherein the first and second voice recognition devices are installed in a computer joystick which is used for generating pointing and key command signals to control the game controller.

* * * * *